E. A. DE COTEAU & H. F. CASEY.
SAFETY FENDER FOR TRACTION CARS.
APPLICATION FILED OCT. 24, 1914.

1,171,101.

Patented Feb. 8, 1916.
2 SHEETS—SHEET 1.

WITNESSES:
Harry C. Daggett.
Dorothy A. Goeres.

INVENTORS
Elzear A. DeCoteau
Henry F. Casey
BY Allen & Daggett
ATTORNEYS

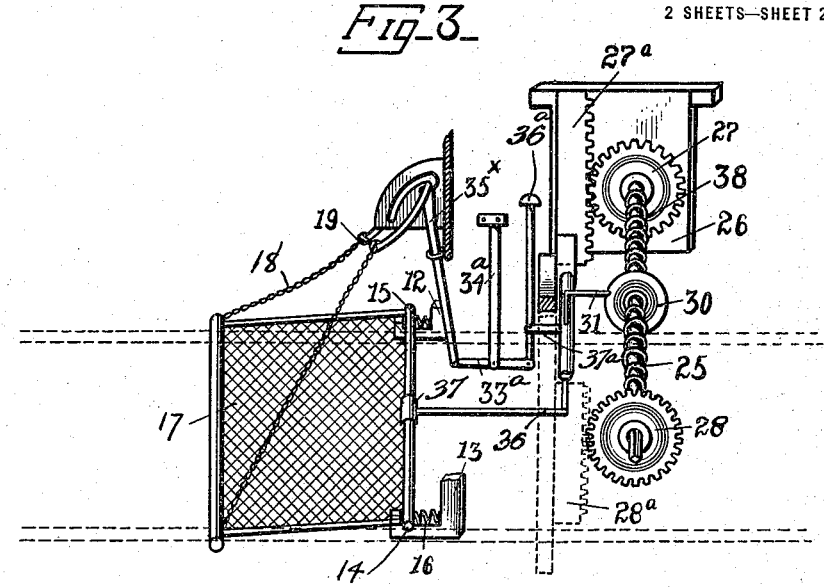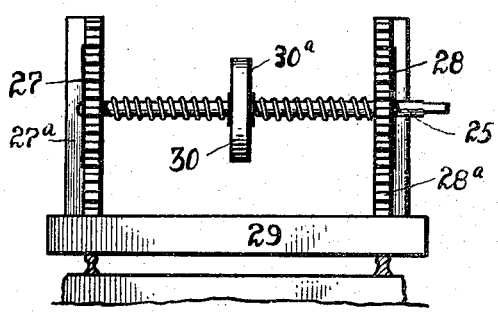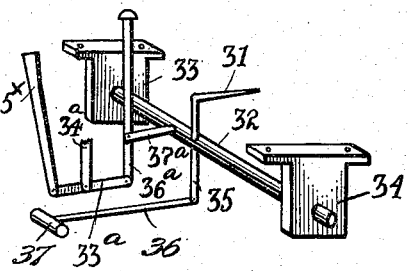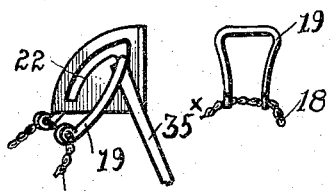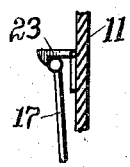

UNITED STATES PATENT OFFICE.

ELZEAR A. DE COTEAU AND HENRY F. CASEY, OF MILFORD, MASSACHUSETTS.

SAFETY-FENDER FOR TRACTION-CARS.

1,171,101.   Specification of Letters Patent.   Patented Feb. 8, 1916.

Application filed October 24, 1914. Serial No. 868,494.

*To all whom it may concern:*

Be it known that we, ELZEAR A. DE COTEAU and HENRY F. CASEY, citizens of the United States, residing at Milford, in the county of Worcester and State of Massachusetts, have jointly invented a certain new and useful Safety-Fender for Traction-Cars, of which the following is a specification, reference being had to the accompanying drawings.

Our invention relates to traction cars generally, but more particularly to so called "street cars" of the electrically propelled type, as operated in the more or less crowded streets of cities, and the said invention has for its object the provision of a safety fender which will operate automatically, and positively, to prevent accidental running over of persons or animals which may be struck and knocked down by such cars.

Figure 1:
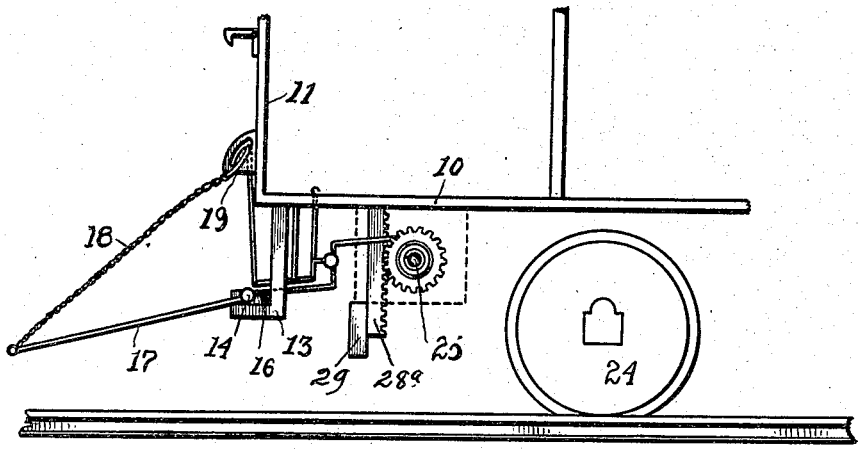
Figure 2:
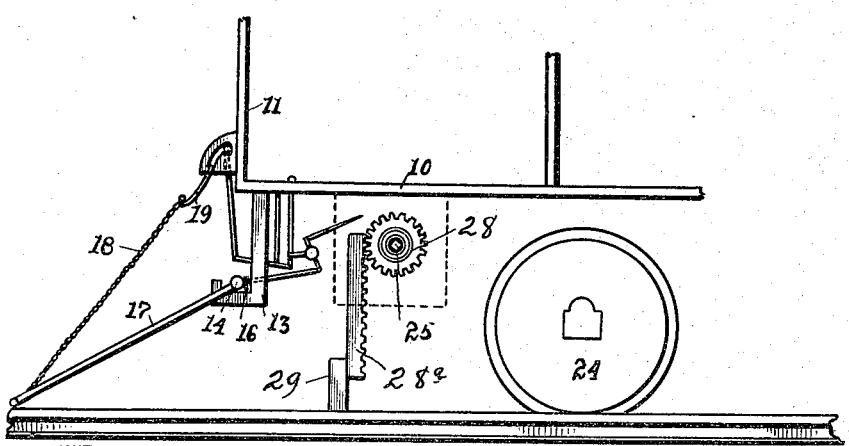

Our said invention is illustrated in the annexed drawings, Figure 1 being a side elevation of a portion of the end of a car having our improvements embodied therein, the fender being shown in its normal position, and Fig. 2 is a similar view showing the fender in its operative or emergency position. Fig. 3 is a perspective view of the fender and its supporting and operating devices. Fig. 4 is a rear side elevation of the guard beam 29 and the rack and pinion mechanism by means of which said beam is raised to its operative position. Fig. 5 is a perspective view of certain elements of the fender releasing mechanism. Fig. 6 shows side and front views of the link by means of which the front fender is supported normally, as well as a side view of a plate 21, secured to the car front, for coöperating with the said link. In Fig. 7 we have shown a hook by means of which the front fender may be raised against the car front and latched thereto.

Our present improvements are applied to the class of safety devices which include a fender or net that is hinged to the front of the car, and our improvements, briefly described, consist in part of means for automatically releasing such fender, and dropping it upon the track, when an obstruction is struck by the fender and simultaneously, a guard beam is dropped upon the rails just in advance of the front traction wheels, which guard beam will engage, and push along upon the track, a person or other obstruction, and thus prevent the said person from being engaged and killed, maimed or otherwise injured by the said wheels.

Referring to these drawings, the numeral 10 indicates the floor frame of a car and 11 denotes the front or dash-board of the same. Depending from the car front are brackets 12 and 13 in which is mounted to slide horizontally a limited distance, a rod 14 which is, normally, forced forward by springs 15 and 16. The fender proper is secured to the rod 14 and is indicated by the numeral 17. Said fender is of the ordinary type, that is to say, it is preferably formed of a framework bearing a net or slats that are adapted to support a person or animal that may be picked up by said fender. Said fender is supported, normally, above the traction rails by means of a chain 18 which has at its upper portion a ring or link 19 that is adapted to engage a hook or projection 20 formed in a plate 21 secured to the car front; the plate 21 being also formed with a downwardly extending slot 22, the arrangement being such that, when the link 19 is hooked up, as in Figs. 1 and 6, the fender 17 will be raised a considerable distance above the traction rails but, when the link 19 is allowed to drop to the bottom of slot 22, the said fender will be lowered until it rests upon the traction rails, as seen in Fig. 2 of the drawings. If it should be desired to raise the fender 17 bodily and hold it in such raised position, that may be readily accomplished by providing on the front board 11 of the car, a catch 23, as seen in Fig. 7.

Just in advance of the traction wheels 24 is a shaft 25, hung in bracket journals 26, said shaft having secured thereto pinion gears 27 and 28 which mesh, respectively, with racks 27$^a$ and 28$^a$ which are mounted to slide vertically in suitable ways and are connected at their lower ends by a bar or beam 29 as will be best understood by reference to Fig. 4 of the drawings. One end of the shaft 25 is adapted to receive a key or wrench by means of which the said shaft and pinion gears may be rotated in order to raise the beam 29 clear of the traction rails and, in order to retain the said beam normally in such raised position, we provide on shaft 25 a disk 30 having a peripheral notch 30$^a$ that is adapted to receive the free end of a bolt 31 of angular form, as here illustrated, the said bolt being carried, and adapted to be rocked, by a rod 32 that is journaled in brackets 33 and 34. Extending downward from rod 32 is an arm 35 to whose free end is hinged a rod 36 whose front end is formed as a collar 37 which encircles the frame portion 14 of the fender 17; the described construction being such that, when the said fender engages an obstruction, and is pushed rearward with sufficient force to overcome the resistance of springs 15—16, the rod 36, acting through the arm 35, will rock rod 32 and will thereby withdraw the bolt 31 from the notch 30ª. This permits the shaft 25 to rotate and allows the beam 29 to drop upon the traction rails.

We will now describe novel means for dropping the fender 17 onto the traction rails when it engages an obstruction, and simultaneously with the dropping of the beam 29. The numeral 33ª denotes a lever which is fulcrumed in the lower end portion of a hanger 34ª secured to the under side of the car frame. Connected to the front end of lever 33ª is a rod 35ˣ whose upper end lies immediately under the link 19 (see Figs. 1–6). The other end of lever 33ª is connected by a link 36ª with an arm 37ª that extends radially from the rod 32, the arrangement of elementary parts being such that, when the fender 17 is pushed rearward by an obstruction, as just above described, and the rod 32 is rocked sufficiently to withdraw bolt 31 from notch 30ª, the arm 35ˣ will be moved upward sufficiently to push the link 19 off from hook 20 and thus permit the front of the fender 17 to drop onto the traction rails as seen in Fig. 2. While the weight of beam 29 will ordinarily be sufficient to cause said beam to drop when released, one or more springs 38 may be suitably coiled upon the shaft 25 to aid in thus forcing the beam down to its operative position. By preferance, we extend the link 36ª upward to, and through, the car floor, so that the motorman may trip the described bolt 31 manually if he wishes to, although our described device is designed to work automatically, thus leaving the motorman quite free to attend to the management of the car and motor in the event of an accident. Should a person be struck by the fender 17, the impact instantly releases both the fender and the beam 29 and they drop onto the traction rails. If, by any extraordinary circumstance, a person should not be picked up by the fender 17, but should fall to the rear of said fender, the guard beam 29 will push him along before it and thus prevent him from being crushed by the traction wheels, in short, the adoption of our present improvement will, we believe, effectually prevent the serious injury of persons or animals resulting from collisions with traction cars.

Having thus described our invention we claim as new and wish to secure by Letters Patent:—

1. The combination with a traction car, of a guard beam, racks connected therewith, pinions engageable with said racks, a fender, a rock shaft and means carried thereby, and means movable with said pinions coöperating with said rocking means to control the descent of the fender and guard.

2. The combination with a traction car, of a guard beam, racks connected therewith, pinions with which said racks are engageable, a fender, a rock shaft connected with the fender, a notched disk on the shaft of said pinions, and means movable with the rock shaft for engaging the notch of the disk.

3. The combination with a traction car, of a guard beam, racks connected therewith, pinions with which said racks are engageable, a fender, a rock shaft connected with the fender, a notched disk on the shaft of said pinions, means movable with the rock shaft for engaging the notch of the disk, a support for the forward end of the fender, and means movable with said rock shaft for disconnecting said means to allow the front of the fender to drop.

ELZEAR A. DE COTEAU.
HENRY F. CASEY.

Copies of this patent may be obtained for five cents each, by addressing the "Commissioner of Patents, Washington, D. C."